(12) United States Patent
Rangarajan et al.

(10) Patent No.: US 9,900,602 B2
(45) Date of Patent: Feb. 20, 2018

(54) OPTIMIZING REMOTE GRAPHICS DELIVERY AND PRESENTATION

(71) Applicant: Citrix Systems, Inc., Fort Lauderdale, FL (US)

(72) Inventors: Srikanth Rangarajan, Bangalore (IN); Shashidhar Ramareddy, Bangalore (IN); Kavitha Ramachandra, Bangalore (IN); Chandra Sekhara Reddy, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 274 days.

(21) Appl. No.: 14/830,790

(22) Filed: Aug. 20, 2015

(65) Prior Publication Data

US 2017/0054987 A1    Feb. 23, 2017

(51) Int. Cl.

| G06F 15/16 | (2006.01) |
|---|---|
| H04N 19/167 | (2014.01) |
| H04L 12/927 | (2013.01) |
| H04L 29/06 | (2006.01) |
| H04L 29/08 | (2006.01) |

(52) U.S. Cl.
CPC ......... *H04N 19/167* (2014.11); *H04L 47/805* (2013.01); *H04L 67/02* (2013.01); *H04L 67/025* (2013.01); *H04L 67/10* (2013.01); *H04L 67/1002* (2013.01); *H04L 67/125* (2013.01); *H04L 67/42* (2013.01)

(58) Field of Classification Search
CPC ..... H04N 19/167; H04L 47/805; H04L 67/42; H04L 67/025; H04L 67/125; H04L 67/02; H04L 67/1002; H04L 67/10

USPC .... 709/203, 217, 230, 238, 246; 348/21, 24, 348/25
See application file for complete search history.

(56) References Cited

U.S. PATENT DOCUMENTS

| 5,978,835 A | 11/1999 | Ludwig et al. |
|---|---|---|
| 6,812,941 B1 | 11/2004 | Brown et al. |

(Continued)

FOREIGN PATENT DOCUMENTS

WO     2010144096 A1    12/2010

OTHER PUBLICATIONS

Rivera, "HDX Learning Series—Queuing and Tossing," The Citrix Blog, Aug. 12, 2009, printed Nov. 1, 2011, pp. 1-4.

(Continued)

*Primary Examiner* — Michael Y Won
(74) *Attorney, Agent, or Firm* — Banner & Witcoff, Ltd.

(57) ABSTRACT

Methods and systems for optimizing and enhancing remote graphics on client devices are presented. A client device may determine a visual focus region of a display of the client device based on a user input. A server may receive, from the client device, data regarding the visual focus region of the display. The server may determine a first subset of an image that corresponds to the visual focus region of the display and a second subset of the image that is external to the visual focus region of the display. The server may apply a lossless encoding to the first subset and a lossy encoding to the second subset. The server may then transmit, to the client device, the first subset through a first channel and the second subset through a second channel, wherein the first channel comprises a higher network bandwidth allocation than the second channel.

12 Claims, 11 Drawing Sheets

(56) References Cited

U.S. PATENT DOCUMENTS

| | | |
|---|---|---|
| 7,792,898 B2 | 9/2010 | Lu et al. |
| 8,225,224 B1 | 7/2012 | Robertson et al. |
| 2002/0057295 A1 | 5/2002 | Panasyuk et al. |
| 2002/0167531 A1 | 11/2002 | Baudisch |
| 2005/0235214 A1 | 10/2005 | Shimizu et al. |
| 2008/0018582 A1 | 1/2008 | Yang et al. |
| 2008/0250345 A1 | 10/2008 | Li et al. |
| 2009/0125838 A1 | 5/2009 | Bhogal et al. |
| 2009/0183085 A1 | 7/2009 | Pasetto et al. |
| 2009/0210817 A1 | 8/2009 | Schmieder et al. |
| 2009/0282359 A1 | 11/2009 | Saul et al. |
| 2009/0292359 A1 | 11/2009 | Borden |
| 2010/0088623 A1 | 4/2010 | Ichino |
| 2011/0214063 A1 | 9/2011 | Saul |
| 2012/0146891 A1 | 6/2012 | Kalinli |
| 2012/0306737 A1 | 12/2012 | Sweet |
| 2014/0184475 A1* | 7/2014 | Tantos ............... H03M 13/356 345/8 |
| 2017/0054987 A1* | 2/2017 | Rangarajan .......... H04N 19/167 |

OTHER PUBLICATIONS

OpenNI™, http://openni.org/, printed Nov. 1, 2011, pp. 1-2.
OpenNI™ User Guide, printed Nov. 1, 2011, pp. 1-44.
Tobii Technology, "The Basics of Eye Tracking," tobii.com/en/eye-tracking-integration/global/.../the-basics-of-eye-tracking/, printed Dec. 15, 2011, pp. 1-2.
User Vision, "Eye-tracking the Kinect," uservision.co.uk/.../eye-tracking-game-playing-experience-highlights-op/, Jul. 13, 2011, printed Dec. 15, 2011, pp. 1-3.
"Chroma subsampling," Wikipedia, printed Dec. 15, 2011, pp. 1-9.
"H.264/MPEG-4 AVC," Wikipedia, printed Dec. 15, 2011, pp. 1-14.
International Search Report of International Application No. PCT/US2013/026708, dated May 14, 2013.

\* cited by examiner

OPTIMIZING REMOTE GRAPHICS DELIVERY AND PRESENTATION

FIELD

Aspects described herein generally relate to computer hardware and computer software. In particular, one or more aspects of the disclosure are directed to computer software for enhancing delivery of remote graphics during desktop virtualization.

BACKGROUND

Many organizations are using desktop virtualization systems to provide more flexible options to address the varying needs of their users. In a desktop virtualization system, a user's computing environment (e.g., operating system, applications, and/or user settings) may be separated from the user's physical computing device (e.g., smartphone, laptop, desktop computer, or the like). By using client-server technology, a virtual desktop may be stored in and administered by a remote server, rather than in the local storage of the client device.

Existing technologies may deliver applications and virtual desktops to users over networks with limited bandwidth. That is, virtual desktop infrastructure (VDI) may be limited by network capacity, and data compression may be used to conserve bandwidth of the overall connection. Data compression may involve eliminating some of the data during compression, resulting in degradation of data quality. In other words, there may be a loss in quality due to bandwidth requirements.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein relate to various systems and techniques for optimizing and enhancing delivery of remote graphics to client devices and approaches for efficiently balancing bandwidth and data quality. For users in industries such as design, healthcare, avionics, finance, engineering, and the like, data quality may be of utmost importance, and aspects described herein address these and other issues.

One or more aspects of the disclosure provide for a method that may include receiving, from a client device, data regarding a visual focus region of a display of the client device; determining a first subset of an image that corresponds to the visual focus region of the display and a second subset of the image that is external to the visual focus region of the display; applying a lossless encoding to the first subset of the image and a lossy encoding to the second subset of the image; and transmitting, to the client device, the first subset through a first channel and the second subset through a second channel different from the first channel, wherein the first channel comprises a larger network bandwidth allocation than the second channel.

One or more aspects of the disclosure provide for a method that may include determining a visual focus region of a display of a client device by identifying a user input; transmitting, by the client device, data regarding the visual focus region of the display to a server; receiving, from the server and through a first channel, a first subset of an image that corresponds to the visual focus region of the display; and receiving, from the server and through a second channel, a second subset of the image that is external to the visual focus region of the display, wherein the second channel comprises a lower network bandwidth allocation than the first channel.

One or more aspects of the disclosure provide for a system that includes at least one processor and memory storing computer-readable instructions. When the computer-readable instructions are executed by the at least one processor, the system may receive, from a client device, data regarding a visual focus region of a display of the client device; determine a first subset of an image that corresponds to the visual focus region of the display and a second subset of the image that is external to the visual focus region of the display; apply a lossless encoding to the first subset of the image and a lossy encoding to the second subset of the image; and transmit, to the client device, the first subset through a first channel and the second subset through a second channel, wherein the first channel comprises a higher network bandwidth allocation than the second channel.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
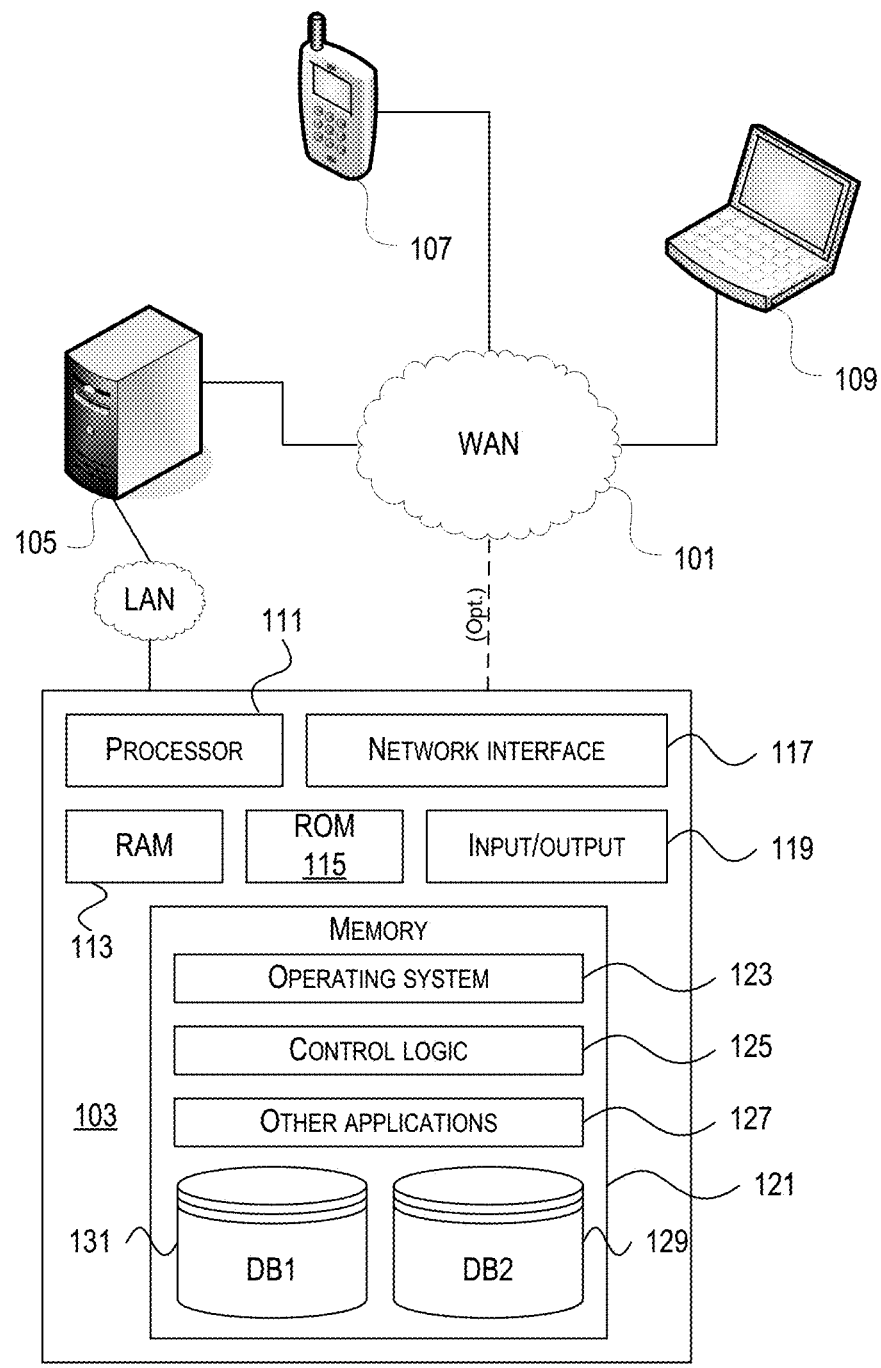
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards optimizing remote graphics on client devices for users. For example, a user may access a virtual application and/or virtual desktop, provided by a server, through a user interface on the client device. The server may host the virtual application and/or virtual desktop and may deliver remote graphics to the client device which are displayed to the user. The server may be able to provide remote graphics to the client device based on the user's visual focus region on a display of the client device. For example, the user may focus on a particular region of the display when accessing and engaging with a virtual application on the client device. The client device may be able to identify a user input and determine the user's visual focus region of the display of the client device. For example, the client device may identify the user input by detecting at least one of a user's eye movement, head movement, hand gesture, body movement, keyboard input, movement in a mouse position of the client device, and the like.

After identifying the user input, the client device may transmit data regarding the user's visual focus region of the display to the server. The server may receive the data regarding the user's visual focus region and determine a first subset and a second subset of an image. That is, the image may be one of several remote graphics that are a part of the virtual application or the virtual desktop. The server may obtain the image to transmit to the client device and determine a first subset of the image, in which the first subset corresponds to the visual focus region of the display. The server may also determine a second subset of the image, in which the second subset corresponds to an area that is external to the user's visual focus region. For example, the first subset of the image may correspond to an area or a region in the display that the user of the client device is focusing on, whereas the second subset of the image may be an area or a region in the display on which the user might not be focusing. In some embodiments, the first subset of the image may be referred to a region of interest, and the second subset of the image may be referred to as a non-region of interest.

After determining the first and second subsets, the server may apply a lossless encoding to the first subset of the image and a lossy encoding to the second subset of the image. Lossless encoding may allow the first subset of the image to be perfectly reconstructed from the compressed or encoded data, whereas lossy encoding may involve elimination or loss of some data regarding the second subset of the image. After encoding, the server may transmit the first subset of the image through a first channel and the second subset of the image through a second channel to the client device, in which the first channel may comprise a higher network bandwidth allocation than the second channel. In some embodiments, the first channel may be referred to as a region of interest (ROI) channel, whereas the second channel may be referred to as a non-region of interest (non-ROI) channel. In additional embodiments, the server may transmit, to the client device, the first subset of the image at a higher frequency than the second subset of the image. Additionally or alternatively, the server may transmit the second subset of the image at a later time than the transmission of the first subset of the image to the client device.

The client device may receive the first subset of the image through the first channel and the second subset of the image through the second channel. After receiving the first and second subsets, the client device may combine the first subset of the image and the second subset of the image to generate a composite image, which may then be displayed on the client device. As a result, the server may advantageously provide content of interest at higher resolutions than other regions of a remote desktop or application to user associated with the client device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
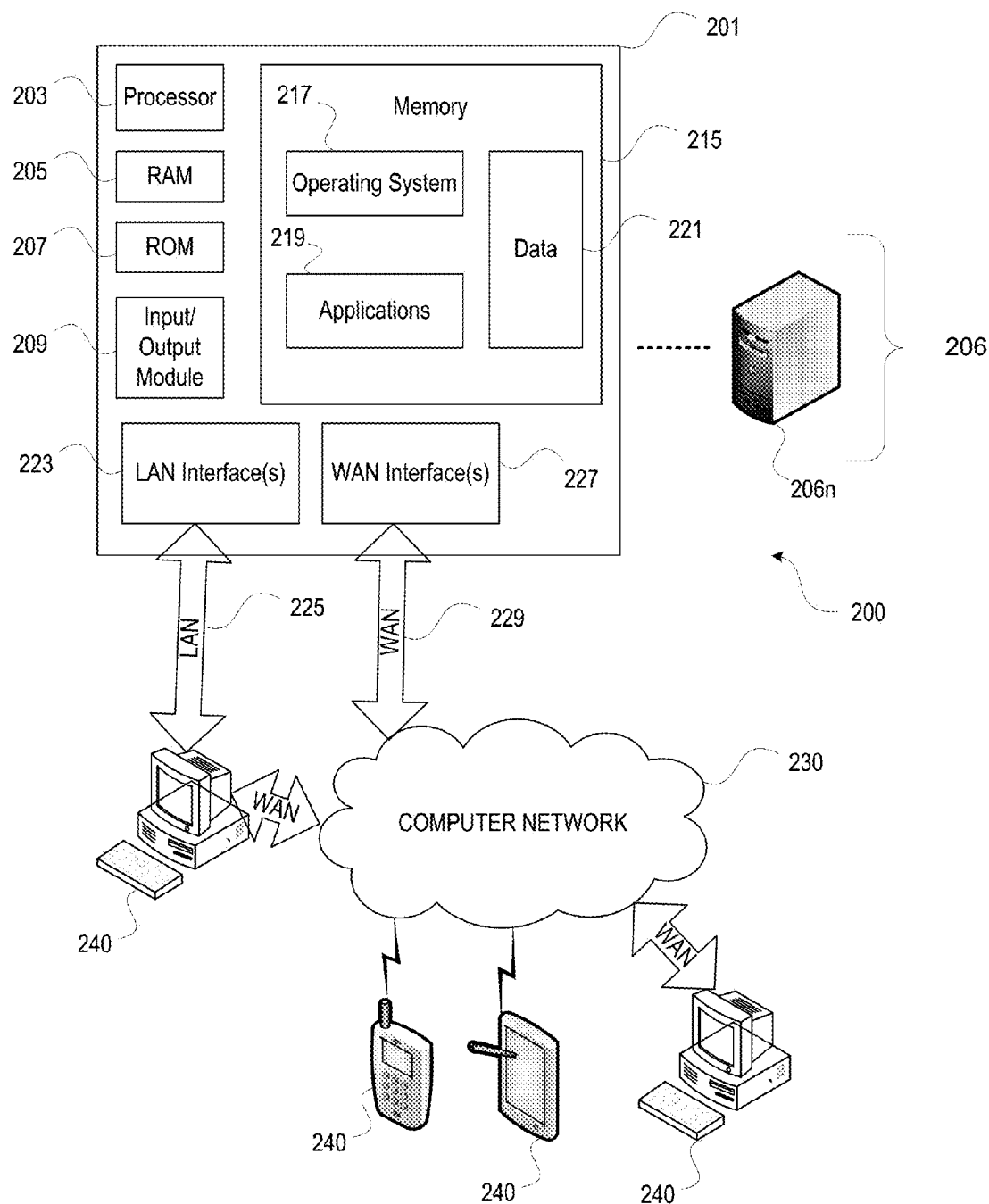
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
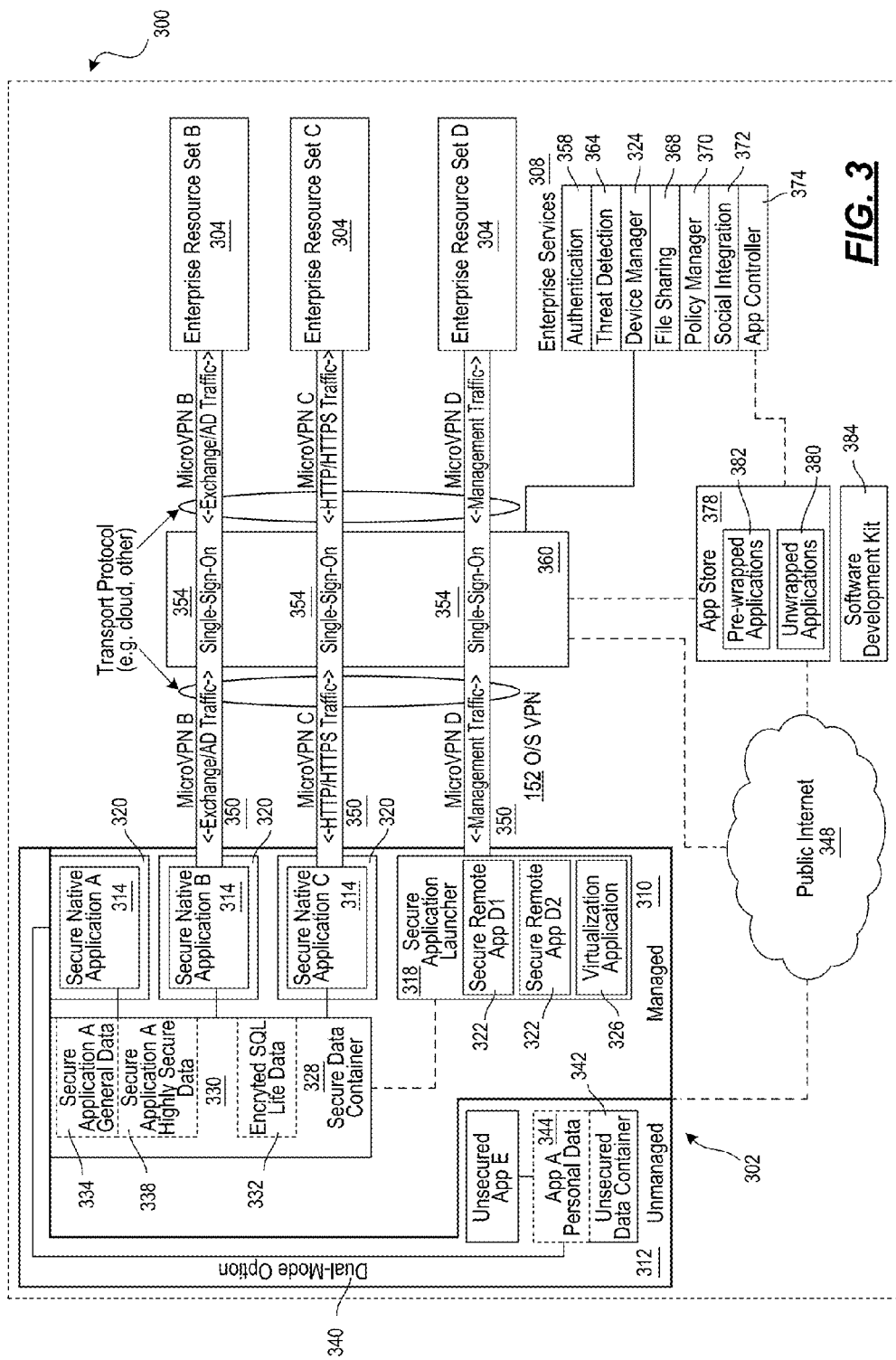
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 548 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
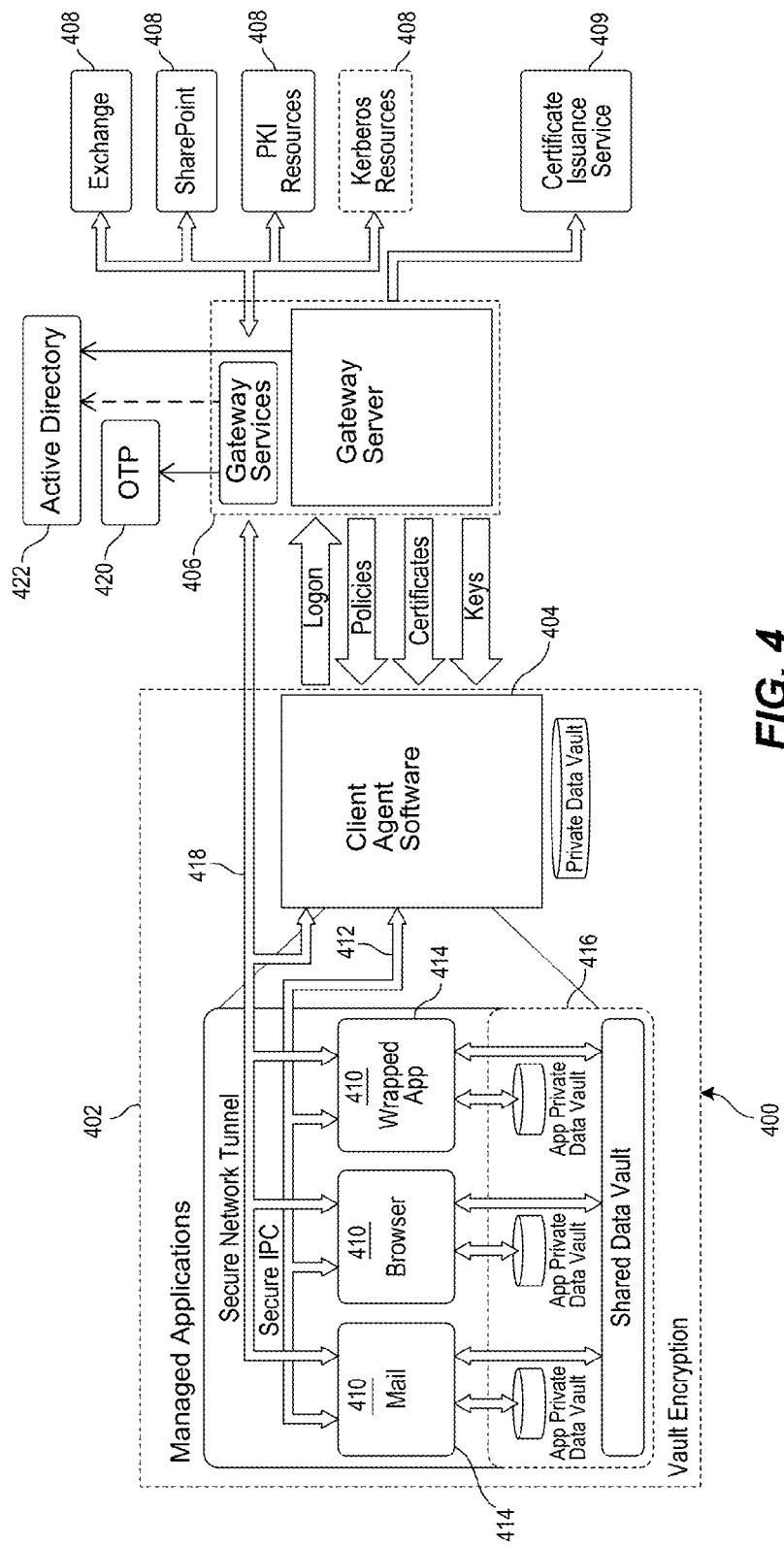
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 400 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and Micro VPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Optimizing Remote Graphics

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing optimized remote graphics to client devices. Aspects of the present disclosure teach determining regions of interest and regions of non-interest based on a user's visual focus region of a display of a client device and delivering content accordingly to the client device. That is, the server may determine a first subset of an image corresponding to a visual focus region of a display of a client device and a second subset of an image that is external to the visual focus region of the display. The server may then use different types of compression and/or encoding to reduce the sizes of data for the first and second subsets of the image prior to transmitting the image subsets to the client device. That is, the server may use lossless compression or encoding for the first subset of the image and lossy compression or encoding for the second subset of the image, in which a portion of data for the second subset of the image may be eliminated during compression or transmission (e.g., a loss in a transmission rate of frames per second).

After encoding, the server may transmit the first subset of the image through a first channel to the client device and the second subset of the image through a second channel to the client device. The first channel may have a higher network bandwidth than the second channel, which may allow for data transmission in the first channel at higher frequencies than data transmission in the second channel. In other words, the server may transmit data regarding the first subset of the image to the client device through the first channel in order to allow the first subset of the image to be perfectly reconstructed at a high resolution on display of the client device. The server may also transmit data regarding the second subset of the image to the client device through the second channel, in which a portion of data regarding the second subset is eliminated, lost, or not transmitted to the client device. That is, lossy encoding may involve loss of data, and the second subset may be displayed a lower resolution than the first subset on the display of the client device. By providing different channels and encoding data according to a user's visual focus region, the present disclosure may improve the user's experience with remote graphics when accessing a virtual application or desktop remotely. In the discussion below, various examples illustrating how remote graphics may be enhanced in accordance with one or more embodiments will be provided.

FIGS. 5-10 illustrate various examples of features, methods, and systems of enhancing remote graphics in client devices in accordance with one or more features described herein. The features and methods described below in reference to FIGS. 5-10 may be performed by a computing device or a combination of devices, such as the various computing devices and systems shown in FIGS. 1-4. The features, steps, and methods described below in reference to FIGS. 5-10 may be performed in any order, and one or more features, steps, or methods may be omitted and/or added. FIGS. 5-10 relate to providing optimized remote graphics from a server for display on a client device. For example, an end user at terminal 240 or client device 302 or 402 may focus on a particular region of a display of a client device, which may be referred to as a visual focus region. The client device may identify the user's visual focus region of the display by detecting a user input, such as one or more of an eye movement, head movement, hand gesture, body movement, keyboard input, movement in a mouse position, and the like, and transmit data regarding the visual focus region to a server 206. Based on the visual focus region, the server 206 may determine which portions of virtual application or virtual desktop content (e.g., images or videos) to display at higher resolutions than other portions. Thus, the user at the client device may receive, from the server 206, a first subset of an image corresponding to the visual focus region of the display and a second subset of an image that is external to the visual focus region of the display.

Figure 5:
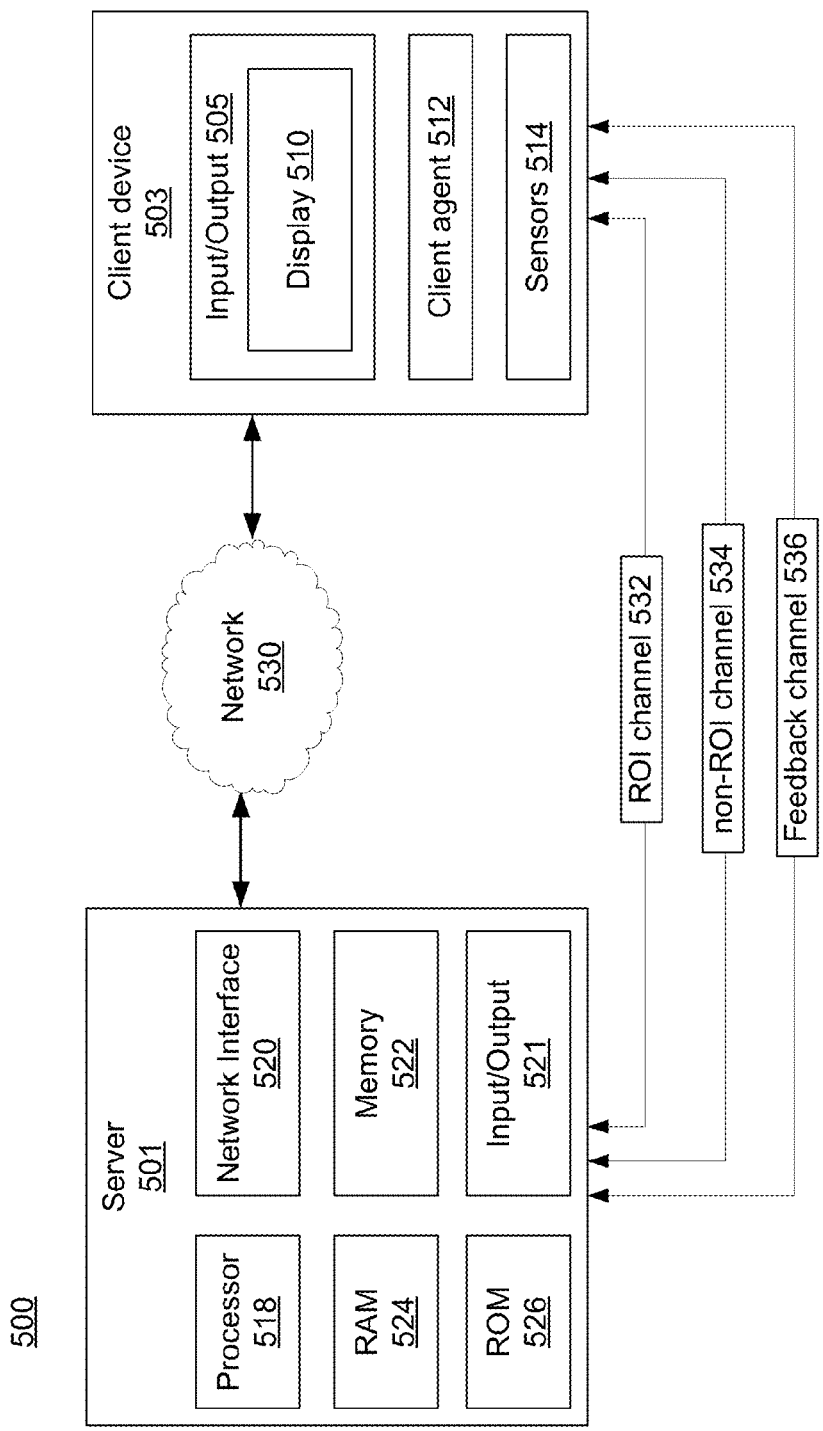
FIG. 5 depicts an illustrative system for providing remote graphics for a virtual application or virtual desktop from a server to a client device in accordance with one or more features described herein.

With particular reference to FIG. 5, an illustrative system 500 provides remote graphics for a virtual application or virtual desktop from a server to a client device in accordance with one or more features described herein. The system 500 may include a server 501 connected to a client device 503 by a network 530. The server 501 and client device 503 may communicate via the network 530, which may be a wide area network (WAN) 101, such as the Internet. The network 530 may comprise one or more networks and may use one or more of a variety of different protocols, such as Ethernet. Server 501, client device 503, and other devices (not shown) may be connected to one or more of the networks via twisted pair wires, coaxial cable, fiber optics, radio waves or other communication media. It is understood that the system 500 may comprise any number of servers 501 and any number of client devices 503.

In an illustrative embodiment, the server 501 may be a virtualization server that provides virtual applications or desktops to the client device 503. For example, the server 501 may be the same as server 206, wherein the server 501 may be configured to provide virtual desktops and/or virtual applications to one or more client devices 503.

The server 501 may comprise a processor 518 that is in communication with network interface 520, input/output (I/O) devices 521, memory 522, random access memory (RAM) 524, and read only memory (ROM) 526. The processor 518 may be referred to as a central processor unit or CPU and may be implemented as one or more CPU chips. The processor 518 may be configured to perform or one or more steps of methods in accordance with one or more features described herein.

The network interface 520 may allow the server 501 to connect to and communicate with the network 530. Through the network 530, the server 501 may communicate with the client device 503 and other devices (not shown), such as laptops, notebooks, smartphones, tablets, personal computers, servers, etc.

The network interface 520 may connect to the network 530 via communication lines, such as coaxial cable, fiber optic cable, etc. or wirelessly using a cellular backhaul or a wireless standard, such as IEEE 802.11, IEEE 802.15, IEEE 802.16 etc., to name a few examples. In some embodiments, the network interface may include a modem. Further, the network interface 530 may use various protocols, including TCP/IP, Ethernet, File Transfer Protocol (FTP), Hypertext Transfer Protocol (HTTP), etc., to communicate with other client devices. The I/O devices 521 may include a variety of interface units and drivers for reading, writing, displaying, and/or printing data or files. For example, the I/O devices 521 may include a keyboard, mouse, display, printer, etc.

The memory 522 may be any computer readable medium for storing computer executable instructions (e.g., software). The instructions stored within memory 522 may enable the server 501 to perform various functions. For example, memory 522 may store software used by the server 501, such as one or more operating systems, application programs, and associated data (not shown) for the server 501. In an embodiment, memory 522 may store remote desktop software for providing virtual desktops and virtualization applications to the client device 503.

The server 501 may also be able to communicate with the client device 503 through a first channel 532, a second channel 534, and a feedback channel 536. In some embodiments, the first channel 532 may be referred to as a region of interest (ROI) channel, whereas the second channel 534 may be referred to as a non-region of interest (NROI) channel. The channels 532, 534, and 536 may represent communication channels or virtual channels for data transmission, with varying bandwidth allocations in the network 530. In some embodiments, the first channel 532 may have a higher network bandwidth allocation than the second channel 534. That is, the first channel 532 may have a greater amount of allocated resources than the second channel 534, including an increased amount of allocated central processing unit (CPU) and graphics processing unit (GPU) resources for the first channel 532.

In some embodiments, the first channel 532 may have a high priority level, whereas the second channel 534 may have a low priority level. For example, the high priority level may indicate the higher network bandwidth allocation of the first channel 532. The high priority level may also indicate that the data in the first channel 532 may be transmitted with first priority using time-division multiplexing mechanisms. That is, the first channel 532 may use a reliable transport mechanism to achieve a guaranteed delivery of data to the client device 503, whereas other channel data (e.g., data transmitted through the second channel 534) may be dropped as necessary to ensure delivery of data in the first channel 532.

The low priority level may indicate the lower network bandwidth allocation of the second channel 534. The low priority level may also indicate that the data in the second channel 534 may be transmitted using an unreliable transport mechanism. That is, the data transmitted through the second channel 534 might not be of particular importance to an end user. Thus, the server 501 may use the second channel 534 to transmit data based on bandwidth availability. Network bandwidth and CPU and GPU resources may be allocated to the second channel 534 based on availability after resources have been initially allocated to the first channel 532.

The server 501 may also use the first channel 532 and the second channel 534 to transmit data at different frequencies to the client device 501. For example, the server 501 may transmit data to the client device 501 at higher frequencies using the first channel 532 and may transmit data to the client device 501 at lower frequencies using the second channel 534. The low priority level of the first channel 532 and the high priority level of the second channel 534 may represent the lower frequency for data transmission and the higher frequency for data transmission, respectively. In some embodiments, the server 501 may be able to save bandwidth and reduce load in the network 530 by employing the first channel 532 to send regions of interest and the second channel 534 to send non-regions of interest to the client device 501.

The feedback channel 536 may be configured to transmit data regarding delivery of virtual content (e.g., images, audio, video, and the like) between the server 501 and the client device 503. For example, the feedback channel 536 may transmit data from the client device 503 to the server 501 in order to inform the server 501 of one or more previous frames or images that were successfully delivered and/or displayed on the client device 503 for each of the first channel 532 and the second channel 534. The feedback channel 536 may also transmit data from the client device 503 to the server 501 to inform the server 501 of a failure in delivery of one or more previous frames or images to the client device 503 for the first and second channels 532 and 534.

Furthermore, the server 501 may store computer-readable instructions in memory 522 in order to provide virtual desktops to the client device 503, as well as virtual application programs that execute after an instance of an operating system and virtual desktop has been loaded on the client device 503. In order for users to access the virtual desktops and virtual applications, the client device 503 may further comprise input/output (I/O) devices 505, a display 510, a client agent 512, and sensors 514.

The I/O devices 505 may include devices such as a microphone, keypad, keyboard, touchscreen, and/or stylus through which a user of the client device 503 may provide input data. The I/O devices 505 may also comprise a display 510, such as a monitor, television, touchscreen, etc. The display 510 may present a user interface of the client device 503 that is accessible to one or more users.

The client agent 512 may be used to access various enterprise resources through virtual desktops and applications provided by the server 501. For example, the client agent 512 may be the same as the client agent 404. The client agent 512 may launch a virtual desktop in the client device 503 after the server 501 has verified the identity and completed authentication of the user associated with the client device 503 as known to those of skill in the art. In an embodiment, the client agent 512 may be a CITRIX® RECEIVER™ brand client agent. A user may utilize the client agent 512 to access applications, desktops, and data through the HDX/ICA display remoting protocol, or through other remoting protocols.

The client agent 512 may also be employed to implement one or more features of the disclosure described herein. In an embodiment, the client agent 512 may allow one or more subsets of an image of a virtual application or a virtual desktop to be delivered by the server 501, through at least one of the first channel 532 and the second channel 534, to the client device 503, wherein the subsets of the image may be presented on the display 510 of the client device 503. The content of the one or more subsets of the image may correspond to a user's visual focus region of the display 510 or correspond to a region that is external to the user's visual focus region of the display 510. The client agent 510 may determine the user's visual focus region based on user input detected by one or more sensors 514.

That is, the client device 503 may comprise one or more sensors 514 which may be used to identify where a user is focusing on in the display 510. For example, the client device 503 may use the one or more sensors 514 to track user input, such as by tracking at least one of a user's eye movement, head movement, hand gesture, body movement, keyboard input, and movement in a mouse cursor, text cursor, or another pointer of the client device 503. The sensors 514 may include one or more cameras, depth sensors, position sensors, audio sensors (e.g., microphone), eye-tracking device, or any other sensor configured to sense the position of a user's focus. In some cases, sensors 514 may include additional sensors, such as gravity sensors, rotational vector sensors, magnetometers, barometers, thermometers, and the like.

The sensors 514 may collect data and identify coordinates that correspond to a point on the display 510 at which the user is looking. In some embodiments, the coordinates may correspond to a position of the user's eyes, head, hand, or the like, with respect to the display 510. Additionally or alternatively, the coordinates may also correspond to a position of the user's mouse cursor, text cursor, or another point of the client device 503. In an example, the sensors 514, such as one or more cameras or eye-tracking devices, may be configured to capture images of a user and collect coordinates corresponding to the user's eyes, head, hands, or the like, with respect to the display 510. That is, the sensors 514 may take a picture of the user at predetermined time intervals while the user access a virtual application or virtual desktop on the client device 501. For example, the sensors 514 may capture an image every 30 milliseconds, 1 second, 5 seconds, 30 seconds, 1 minute, or at another shorter or longer time interval. In some embodiments, the sensors 514 may capture an image when a significant change in the user's focus region is detected at the client device 503. For example, the sensors 514 may generate data comprising coordinates of the user's visual focus region at certain time intervals. If the client device 503 receives data from the sensors 514 that comprises a percentage of change above a certain threshold (with respect to previous coordinates), then the sensors 514 (e.g., a camera) may determine a new visual focus region of the display for the user.

Using the data collected from the one or more sensors 514, the client device 503 may be able to determine that the user is reading or viewing a particular portion of an image on the display 510. In other words, the client device 503 may be able to identify a visual focus region of the user based on the collected data from the one or more sensors 514. The client device 503 may then generate data regarding the visual focus region to transmit to the server 501.

In some embodiments, the client device 503 may determine a resolution of the display 510, in which the display resolution may comprise a number of pixels in each dimension of the display 510 of the client device 503. That is, the display resolution may be defined as the number of pixels in the width of the display by the number of pixels in the height of the display, or vice versa. For example, the display resolution of the client device 503 may be 1920×1080 pixels, 1024×768 pixels, 800×600 pixels, 640×480 pixels, or any other resolution based on the particular hardware in use. The client device 503 may use the display resolution in generating data regarding the visual focus region and may transmit this data the server 501 as well. In some embodiments, the display resolution of the client device 503 may match the resolution of the virtual application or desktop provided by the server 501. For example, the server 501 may provide, to the client device 503, a virtual application or desktop that is full screen or covers a portion of the display 510. In some cases, the server resolution may match the client device resolution, and the client device may transmit data regarding the user's focus region, along with data regarding the display resolution, to the server 501.

Figure 6A:
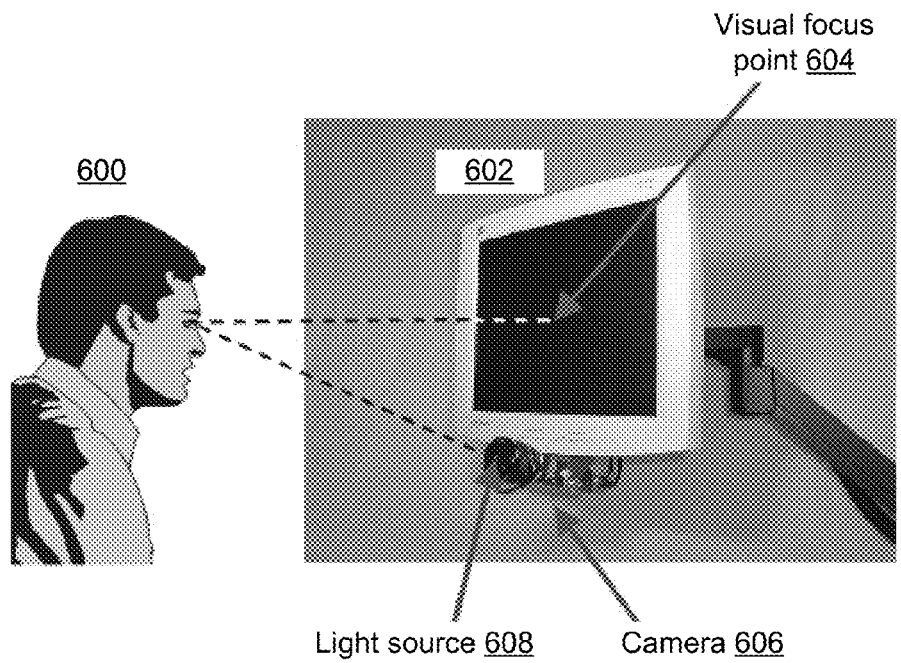
FIGS. 6A and 6B depict illustrative diagrams of examples for determining a visual focus region of a user for providing remote graphics to a client device in accordance with one or more features described herein.
Figure 6B:
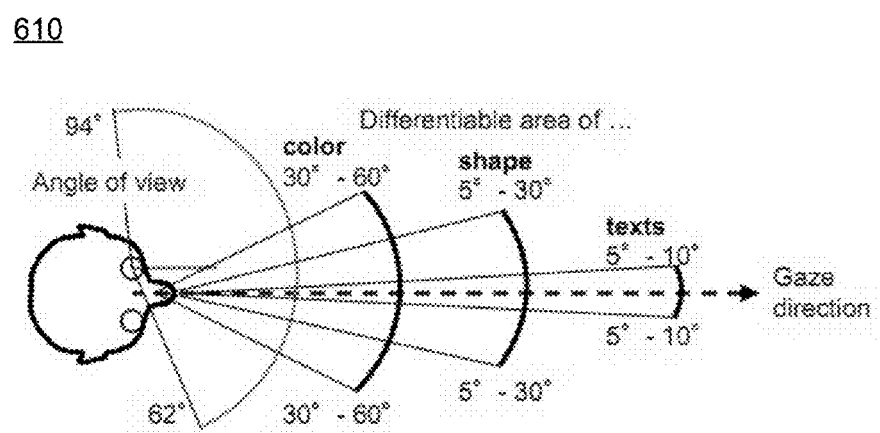

FIGS. 6A and 6B depict illustrative diagrams of examples for determining a visual focus region of a user for providing remote graphics to a client device in accordance with one or more features described herein. FIG. 6A illustrates an example diagram of a user 600 viewing a display 602 of a client device at a visual focus point 604. The visual focus point 604 may represent coordinates that correspond to the point on the display 602 at which the user 600 is looking. The client device may comprise sensors, such as a camera 606 and also a light source 608 which may be used to track the user's eye position and determine the visual focus point 604. In some embodiments, the user's eye position may be tracked by tracking the position of the user's pupil and/or iris by using the camera 606, such as a 3-D camera, or the light source 608, such as an infrared light source. For example, the light source 608, such as an infrared light source, may illuminate the cornea of the user's eyes to determine the position of the user's pupil and/or iris, and the camera 606 may be used to track the position of the user's eyes. From the visual focus point 602, the client device may be able to determine a user's visual focus region of the display 602 and send data regarding the visual focus region to a server. For example, the client device may be able to determine the visual focus region from the gaze point based on calculating the user's angle of view. The server may determine a first subset of an image that corresponds to the visual focus region and a second subset of the image that is external to the visual focus region. The server may apply a lossless encoding to the first subset of the image and a lossy encoding to the second subset of the image. Subsequently, the server may transmit the first and second subsets of the image through first and second channels, respectively, to the client device, and the client device may present a composite image comprising the first and second subsets on the display 602 to the user 600.

In another feature of the disclosure, the server 501 may be able to prioritize one or more subsets of an image to transmit to the client device 503. For example, the server 501 may receive, from the client device 503 and through a feedback channel 536, data regarding a failure in delivery of a particular subset (e.g., a first subset or a second subset) of an image to the client device 503. That is, the particular subset of the image might not have been displayed on the client device 501 successfully or delivery of the subset to the client device may have failed. In order to redeliver the subset, the server 501 may apply a priority level to the particular subset of the image. For example, the server 501 may increase a priority level of the particular subset of the image by a certain value.

In some cases, the server 501 may analyze the particular subset of the image and assign a priority level corresponding to the content of the particular subset of the image. For example, if the particular subset or region comprises a change in data above a certain threshold (in comparison to a previously displayed frame), the server 501 may assign a first priority level to the subset. If the particular subset or region comprises a text update, the server 501 may assign a second priority level to the subset. If the particular subset or region comprises a rapid color change (e.g., a blinking effect), the server 501 may apply a third priority level to the subset. Accordingly, the server 501 may apply different priority levels to subsets based on content of subsets.

Furthermore, there may be multiple frames or subsets with different priority levels. The server 501 may determine which subset of an image to transmit first based on the assigned priority levels. For example, if the server 501 determines a value of a priority level of a particular subset of an image to be above a predefined threshold value, then the server 501 may transmit the particular subset through a first priority channel (e.g., first channel 532). That is, the first channel 532 may be designated to transmit subsets that are not within a user's visual focus region (e.g., non-region of interest) based on the assigned priority levels of the particular subsets. In some embodiments, non-regions of interest (e.g., second subsets that are external to the user's visual focus region) may be pushed to the client device 503 using the first channel 532. After transmitting the subsets through the first channel 532, the server 501 may receive a notification, through the feedback channel 536 and from the client device 503, indicating that the non-regions of interest have been successfully delivered and/or presented in the display 510 of the client device 503. The server 501 may reset the priority of the first channel 532, and non-regions of interest may continue to be transmitted through the second channel 534.

FIG. 6B illustrates an example diagram 610 of different visual areas of an eye. For example, the human vision field may be categorized into different visions or visual areas, including foveal vision (e.g., central vision, gaze direction or line of sight), para-foveal vision, and peripheral vision. Each vision may have distinct characteristics due to the retina (e.g., light sensitive surface) not being equally sensitive to details present in front of an eye. For example, a user may be able to focus on a narrow portion of a screen or display while reading or typing text. Additionally or alternatively, a user may focus on a broader region of a screen or display when looking at a shape or color. In other words, depending on the type of vision being used, a user's eye may focus on a color, shape, or text within a broad or narrow region of the user's view. The example diagram 610 illustrates these different areas and angles associated with different user views.

In another feature of the disclosure, a client device (e.g., client device 503) may be able to track and analyze visual attention patterns and identify visual attention regions (e.g., a user's visual focus region or the user's region of interest) using various techniques, such as by eye tracking, determining a cursor location, current mouse location, or touch input region, using windowing information (e.g., a window is in focus, and a second window is in a foreground of a display), using certain colors or hues on a display (e.g., colors which naturally tend to attract human vision), determining a region of a display that changes most frequently, identifying images with contrasting colors on a display, and the like.

In some embodiments, the client device may be able to determine the region of interest (e.g., the visual focus region) from the gaze point based on calculating the user's angle of view. For example, the client device may determine an area that is within a 5° to 10° angle of view for the user as a region of interest with a first priority level. The client device may then determine a second area within a 10° to 30° angle of view for the user as a non-region of interest with a second priority level, wherein the first priority level is higher than the second priority level. In some embodiments, the second area may be assigned a second priority level because the second area may comprise text or vector graphics. Furthermore, the client device may also determine a third area within a 30° to 60° angle of view for the user as a non-region of interest with a third priority level, wherein the second priority level is higher than the third priority level. In some embodiments, the third area may be assigned a third priority level because the third area may comprise vector graphics and color. After identifying the region of interest, the client device may send this information to a server (e.g., server 501).

As described herein, the server may use immediate mode and deferred mode graphics rendering techniques for providing optimized remote graphics to a client device. For example, the server may identify a first region of a remote graphic that the user is focusing on based on identifying the user's visual attention patterns and/or the user's visual focus region. The server may determine a second region of the remote graphic that does not fall within the line of eyesight of a user or within the user's visual focus region. In some embodiments, the server may designate the first region of the remote graphic as an immediate mode region and the second region of the remote graphic as a deferred mode region. After determining the different regions, the server may send the immediate mode region to the client device first (e.g., immediately) before sending the deferred mode region. That is, the immediate mode region (e.g., the region of interest) may be assigned a higher priority level for transmission to the client device than the priority level of the deferred mode region.

The server may also send the immediate mode region to the client device at a higher frequency than the frequency of transmission for the deferred mode region. In some embodiments, the server may send the deferred mode region to the client device at a later time than the time at which the immediate mode region is sent to the client device. After receiving the immediate mode region and the deferred mode region for the remote graphic from the server, the client device may render the immediate mode region on the display at a higher resolution than the deferred mode region. That is, the regions of the remote graphic presented on the display may have different resolutions based on the user's visual focus region.

Furthermore, in some embodiments, the client device may determine a visual focus region of a display and identify if anything has changed within the visual focus region in comparison to a previous remote graphic. That is, the client device may determine if there is a dirty rectangle (e.g., an area that has changed in comparison to a previous screen) in the focus region. Based on the determination, the client device may transmit the visual focus region to the server, and the server may determine immediate mode and deferred mode regions within a remote graphic to transmit to the client device. In some embodiments, if a dirty rectangle is identified in a region that is external to the user's visual focus region of the display, then the server might not send this region of the remote graphic to the client device immediately. That is, the server may designate this region as a deferred mode region.

For example, a user may be typing in a word processor application in a remote desktop presented on the client device. In the corner of the screen, the time may change in a clock displayed in the remote desktop. The user may be focusing on a specific region in the word processor, which may correspond to the user's visual focus region on the client device. The server may thus determine the specific region in the word processor to be an immediate mode region and the regions of the screen external to the word processor to be a deferred mode region. That is, the region displaying the clock may be designated as a deferred mode region. For example, the server might not immediately update the region displaying the clock on the remote desktop because this region might have a lower priority level than the priority level of the immediate mode region and might not be of most importance to the user of the client device.

Thus, a region that is external to the user's visual focus region might not be updated regularly. That is, a cached local copy of a remote graphic that was previously delivered may be displayed on the client device for a region that is external to the user's visual focus region. For example, regions in a user's visual focus area may be updated regularly (e.g., once per millisecond, per second, or the like), whereas the regions that are external to the user's visual focus area may be updated less frequently (e.g., once every 10 milliseconds, once every 5 seconds, once every 30 seconds, or the like). By implementing immediate and deferred mode rendering techniques, a server (e.g., server 501) may be able to save bandwidth and reduce load in a network (e.g., network 530) by transmitting and rendering regions of interest in a graphic in an immediate mode and deferring non-regions of interest for transmission and rendering at a later time.

Figure 7:
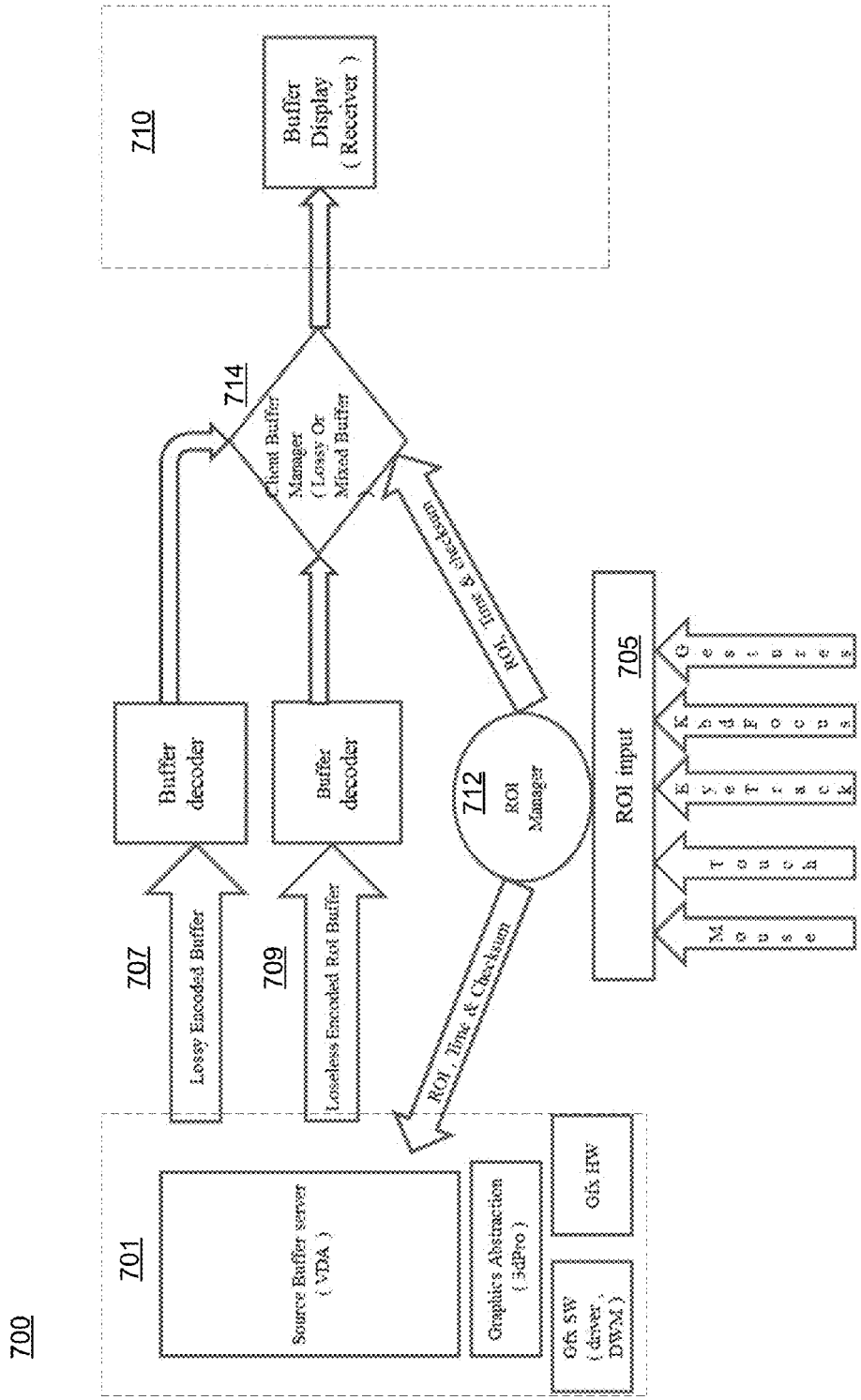
FIG. 7 depicts an illustrative diagram of a proposed architecture for providing optimized remote graphics from a server to a client device in accordance with one or more features described herein.

FIG. 7 is an illustrative diagram of a proposed architecture for providing optimized remote graphics from a server to a client device in accordance with one or more features described herein. The architecture 700 may comprise a server 701, a user input module 705, a lossy encoded buffer 707, a lossless encoded buffer 709, a display 710 of a client device, a region of interest (ROI) manager 712, and a client buffer manager 714. The server 701 may provide virtual desktop infrastructure to users and may comprise a graphics abstraction layer, graphics software (e.g., drivers), graphics hardware, and the like. The user input module 705 may be a module of the client device, which may be configured to detect an input from a user and determine a user's visual focus region of the display 710. For example, user input may include at least one of a user's eye movement, head movement, hand gesture, body movement, keyboard input, and movement in a mouse cursor, text cursor, or another pointer of the client device. The user input module 705 may calculate coordinates corresponding to the user's visual focus region and transmit this data to the server 701.

The server 701 may also maintain two encoders, such as a lossy encoder and a lossless encoder. The lossy encoder may degrade a subset of an image (e.g., eliminate a portion of the data during compression/encoding) before sending the subset through the lossy encoded buffer 707 to the client buffer manager 714. The lossless encoder may use the lossless encoded buffer 709 to process a subset of an image that is a region of interest without losing resolution or without losing data quality of the region of interest. Both the lossless and lossy regions of an image may be transmitted to the client buffer manager 714, which may then merge the regions together before sending the image to the display 710.

The region of interest manager 712 may be a module that manages times and checksums for each region of interest (e.g., each frame) that is transmitted from the client device to the server and/or from the server to the client device. The client buffer manager 714 may receive data from the region of interest manager 712 and may use the times and checksums for validation of frames at the client device. For example, the client buffer manager 714 may receive a region of interest image and may perform validation by determining whether the currently received region of interest image is relevant to the last frame received based on the time and checksum. Depending on the results from validation, the client buffer manager 714 may either discard a region of interest image or combine the region of interest image with the last frame received to present on the display 710 of the client device.

Figure 8A:
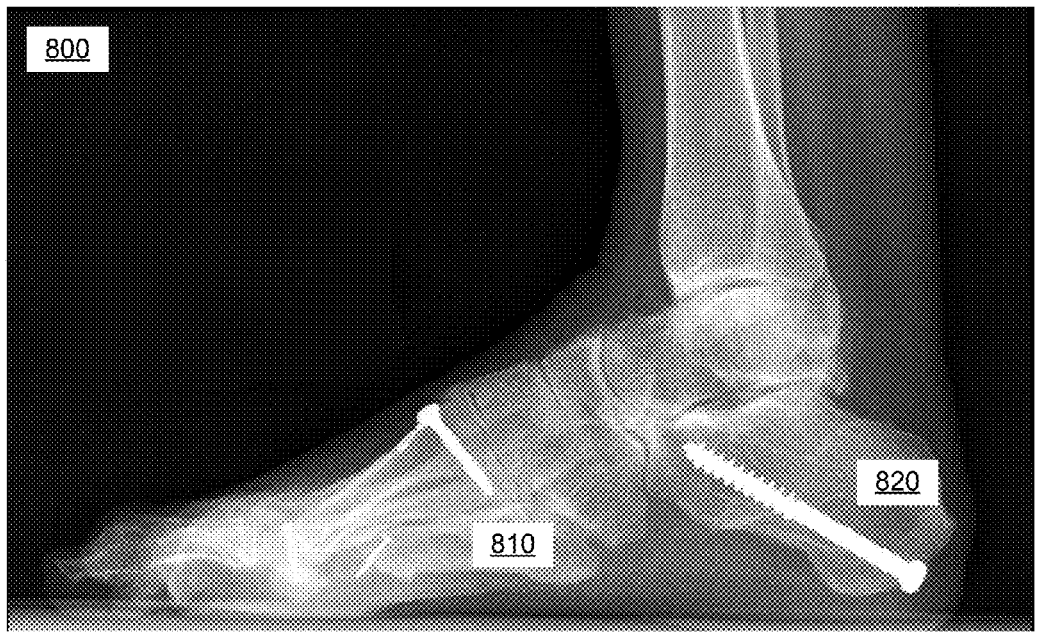
FIGS. 8A, 8B, 8C, and 8D depict illustrative diagrams of examples of a remote graphic optimized in response to a user's visual focus region in a display of a client device in accordance with one or more features described herein.
Figure 8B:
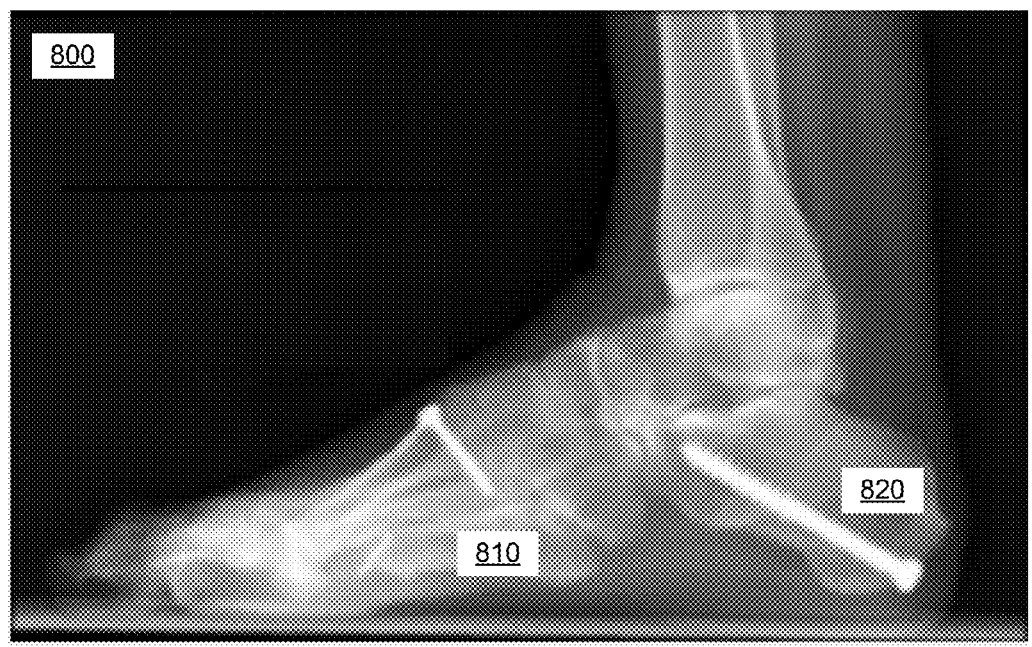

FIGS. 8A-8D depict illustrative diagrams of examples of remote graphics optimized in response to a user's visual focus region in a client device display in accordance with one or more features described herein. FIGS. 8A-8D each depict an example image 800 of an X-ray image with a region 810 and a region 820. FIG. 8A illustrates the original image 800 in a high resolution, in which the original image 800 may be stored on a server. Using conventional techniques, the server may deliver the original image 800 to a client device in a virtual desktop or virtual application, which may result in a degraded image with low quality as illustrated by the degraded image 800 in FIG. 8B. That is, there may be a loss in data during transmission, and the client device may receive a low quality image to display to the user. In some embodiments, industries, such as design, healthcare, avionics, finance, engineering, and the like, desire high quality data, including audio, images, and videos, which may be necessary for usability. For example, high resolution images (e.g., lossless images) may be particularly important in healthcare, such as for analyzing and interpreting X-ray images or other microscopy images for diagnostic purposes.

Figure 8C:
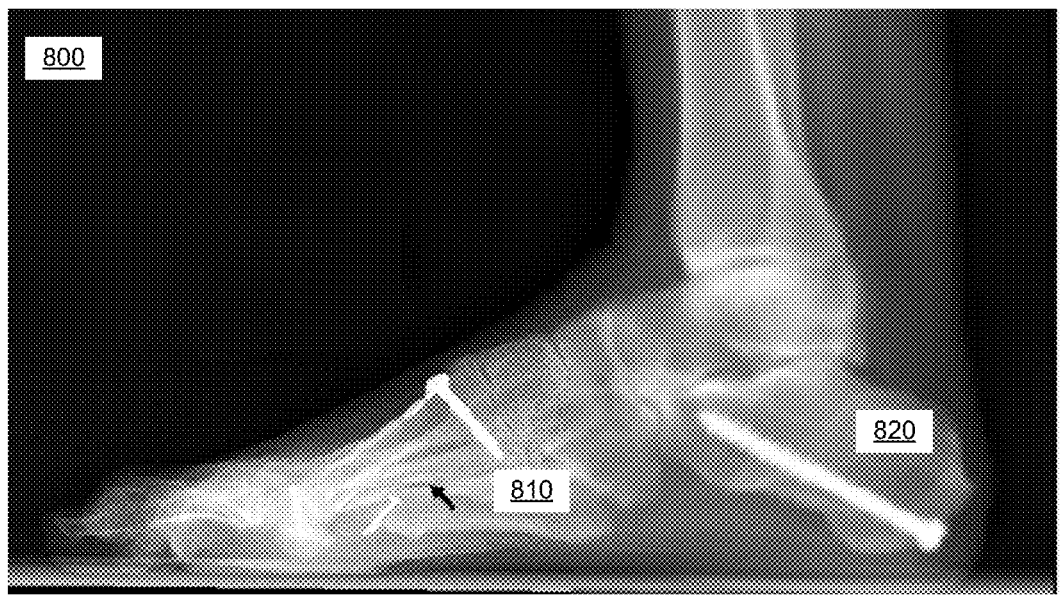
Figure 8D:
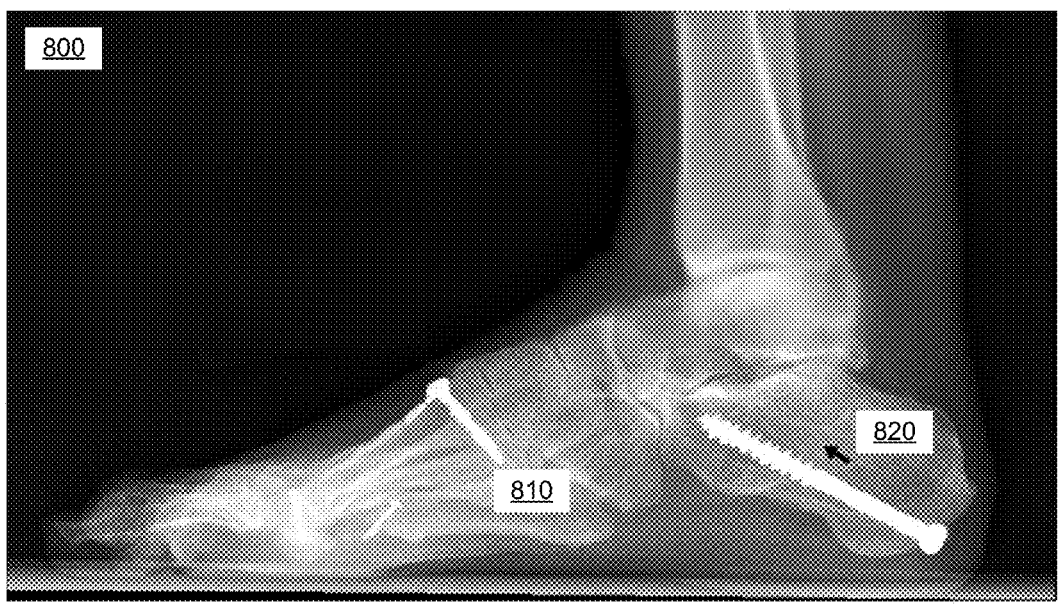

Therefore, by using the methods and systems disclosed herein, the server may apply optimized remote graphics techniques to deliver regions of interest to a user at the client device. FIGS. 8C and 8D each present example images 800 in which different regions of the image 800 may be displayed in a higher resolution. For example, in FIG. 8C, the user of a client device may be interested in region 810 and may focus on this area of the image 800. Thus, the client device may be able to detect the user's visual focus region by tracking the user's eye movement, head movement, hand gesture, body movement, keyboard input, mouse cursor, text cursor, or the like. The server may receive data regarding the user's visual focus region and determine that region 810 is within the user's visual focus region and that region 820 is external to the user's visual focus region. Thus, the server may apply lossless encoding to region 810 and lossy encoding to region 820, and subsequently deliver the content through different channels to the client device. As illustrated in FIG. 8C, region 810 may comprise a higher resolution than the resolution of region 810, which may be useful to the user for various purposes. Similarly, in FIG. 8D, the user of a client device may be more interested in region 820 than in region 810, and may focus on this area of the image 800. The server may thus deliver the region of interest 820 to the user with a higher resolution than the resolution of the region 810.

Figure 9:
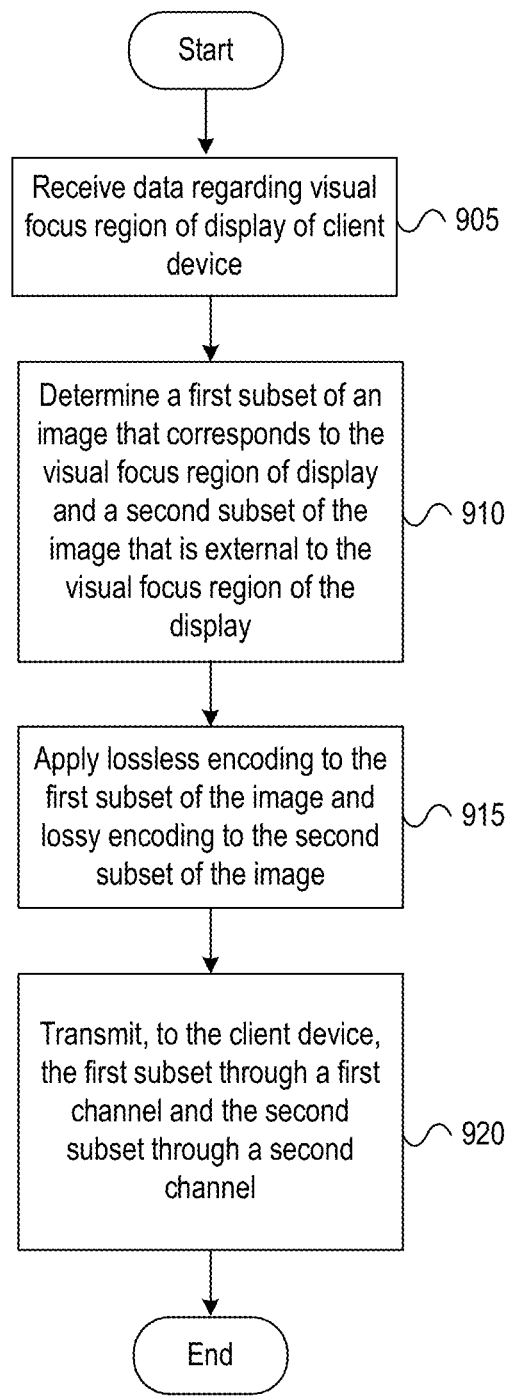
FIG. 9 depicts an illustrative flow diagram illustrating an example process for providing optimized remote graphics for a virtual application or virtual desktop from a server to a client device in accordance with one or more features described herein.

FIG. 9 depicts an illustrative flow diagram illustrating an example process for providing optimized remote graphics for a virtual application or virtual desktop from a server to a client device in accordance with one or more features described herein. In one or more embodiments, the method illustrated in FIG. 9 and/or one or more steps thereof may be performed by a server (e.g., a server such as a server 206, enterprise resource servers 304, server 406, or server 501). In other embodiments, the process illustrated in FIG. 9 and/or one or more steps thereof may be embodied in computer-executable instructions that are stored in a computer-readable medium, such as a non-transitory computer-readable memory. Alternatively or additionally, any of the steps in the method of FIG. 9 may be performed on any server.

As illustrated in FIG. 9, the method may begin at 905 in which a server may receive data regarding a visual focus region of a display of a client device. For example, the server 501 may receive data regarding a user's visual focus region of the display 510 of the client device 503. At step 910, the server may determine a first subset of an image that corresponds to the visual focus region of the display and a second subset of the image that is external to the visual focus region of the display. For example, the server 501 may determine a portion or a region of a remote graphic that is of most importance to a user at the client device 503 based on the user's visual focus region. In some cases, the server 501 may use one or more coordinates obtained from the client device 503 to determine the first subset of the image that corresponds to the visual focus region of the display 510. The server 501 may then determine the second subset of the image by identifying a region that lies external to (e.g., outside of) the one or more coordinates corresponding to the user's visual focus region of the display 510.

At step 915, the server may apply lossless encoding to the first subset of the image and lossy encoding to the second subset of the image. For example, the server 501 may eliminate a portion of the data regarding the second subset of the image, while maintaining the original data regarding the first subset of the image so that the first subset of the image may be perfectly reconstructed upon delivery to the client device. At step 920, the server may transmit, to the client device, the first subset through a first channel and the second subset through a second channel. For example, after applying lossless and lossy encoding to the respective subsets, the server 501 may transmit the first subset of the image through the first channel 532 (e.g., the region of interest channel) to the client device 503 and the second subset of the image through the second channel 534 (e.g., the non-region of interest channel) to the client device 503. In some embodiments, the first channel (e.g., channel 532) may have a higher network bandwidth allocation and a higher priority level than the bandwidth allocation and priority level of the second channel (e.g., channel 534).

Figure 10:
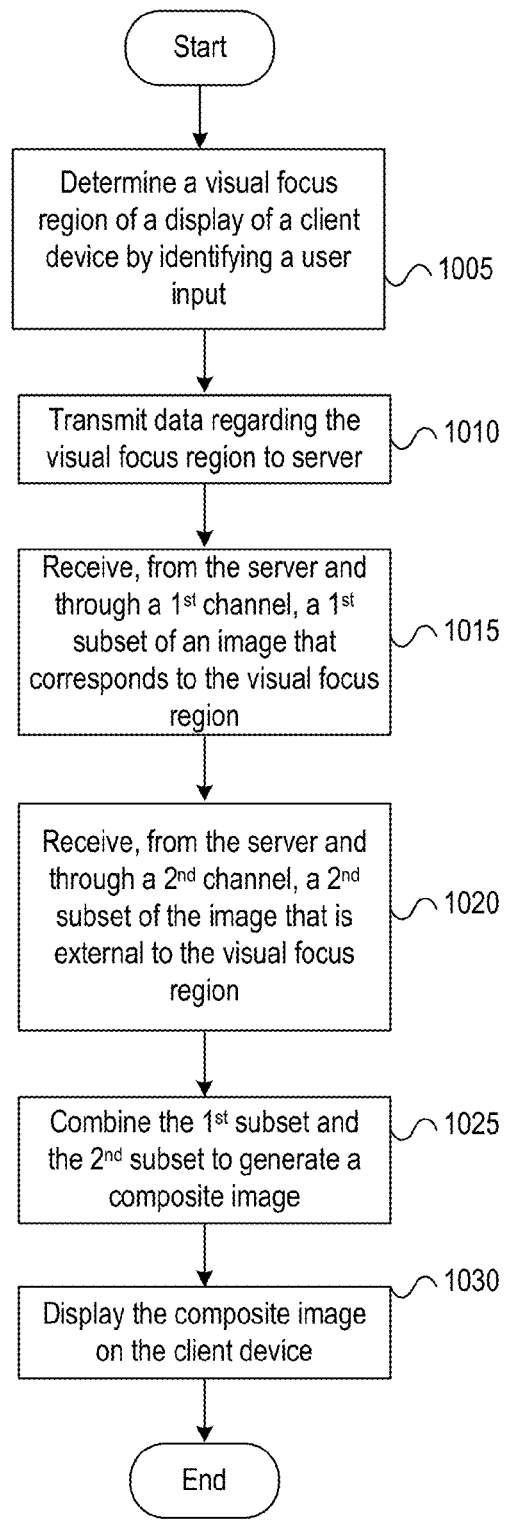
FIG. 10 depicts an illustrative flow diagram illustrating an example process of determining a visual focus region of a client device and receiving optimized remote graphics from a server in accordance with one or more features described herein.

FIG. 10 is an illustrative flow diagram illustrating an example process of determining a visual focus region of a client device and receiving optimized remote graphics from a server in accordance with one or more features described herein. In one or more embodiments, the method illustrated in FIG. 10 and/or one or more steps thereof may be performed by a computing device (e.g., a client device such as terminal 240, client device 302, enrolled mobile device 402, or client device 503). In other embodiments, the process illustrated in FIG. 10 and/or one or more steps thereof may be embodied in computer-executable instructions that are stored in a computer-readable medium, such as a non-transitory computer-readable memory. Alternatively or additionally, any of the steps in the method of FIG. 10 may be performed on any client device.

As illustrated in FIG. 10, the method may begin at step 1005 in which a client device may determine a visual focus region of a display by identifying a user input. For example, the client device 503 may identify a user input by detecting at least one of a user's eye movement, head movement, hand gesture, body movement, keyboard input, movement in a mouse position of the client device, and the like. At step 1010, the client device may transmit data regarding the visual focus region to a server. In some embodiments, the client device 503 may transmit one or more coordinates that correspond to a point or a region on the display 510 at which the user is looking. For example, the one or more coordinates may correspond to at least one of a position of the user's eyes, head, hand, the user's mouse cursor, text cursor, or another point of the client device 503.

At step 1015, the client device may receive, from the server and through a first channel, a first subset of an image that corresponds to the visual focus region. For example, the client device 503 may receive a first subset of an image from the server 501 through the first channel 532 (e.g., region of interest channel). The first subset of the image may correspond to the user's visual focus region of the display 510 (e.g., the user's region of interest) and may comprise lossless encoding. In some cases, the first subset of the image may be transmitted to the client device 503 using the first channel 532 at a higher frequency than the frequency of transmission of the second channel 534.

At step 1020, the client device may receive, from the server and through the second channel, a second subset of the image that is external to the visual focus region. For example, the client device 503 may receive a second subset of the image from the server 501 through the second channel 534 (e.g., non-region of interest channel). The second subset of the image may correspond to the region that is external the user's focus region of the display 510 (e.g., the user's non-region of interest) and may comprise lossy encoding. In some cases, the second subset of the image may be transmitted to the client device 503 using the second channel 534 at a lower frequency than the frequency of transmission of the first channel 532. Furthermore, the second channel (e.g., channel 534) may have a lower network bandwidth allocation and a lower priority level than the bandwidth allocation and the priority level of the first channel (e.g., channel 532).

At step 1025, the client device may combine the first subset of the image and the second subset of the image to generate a composite image. For example, the client device 503 may merge the first subset of the image and the second subset of the image before presenting the remote graphic to the user on the display 510. The composite image may comprise a region of interest that is displayed at a higher resolution than the resolution at which a non-region of interest is presented on the display 510 of the client device 503. At step 1030, the client device may display the generated composite image to the user.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, from a client device, data regarding a visual focus region of a display of the client device;
determining a first subset of an image that corresponds to the visual focus region of the display and a second subset of the image that is external to the visual focus region of the display;
applying a lossless encoding to the first subset of the image and a lossy encoding to the second subset of the image;
transmitting, to the client device, the first subset through a first channel and the second subset through a second channel different from the first channel, wherein the first channel comprises a larger network bandwidth allocation than the second channel;
receiving, from the client device and through a feedback channel, data regarding a failure in delivery of the second subset of the image to the client device;
increasing a priority level of the second subset of the image; and
retransmitting, to the client device, the second subset based on the increased priority level.

2. The method of claim 1, wherein transmitting further comprises transmitting the first subset at a higher frequency than the frequency of transmission for the second subset.

3. The method of claim 1, wherein transmitting further comprises transmitting the second subset at a later time than the transmission of the first subset.

4. The method of claim 1, wherein the first channel has a higher priority level than the second channel.

5. The method of claim 1, further comprising:
when the value of the priority level of the second subset of the image is determined to be above a predefined threshold value, retransmitting comprises transmitting the second subset through the first channel to the client device.

6. The method of claim 1, wherein the visual focus region is based on at least one of a user's eye movement, head movement, hand gesture, body movement, keyboard input, and movement in a mouse position of the client device.

7. A system comprising:
at least one processor; and
memory storing computer-readable instructions that, when executed by the at least one processor, cause the system to:
receive, from a client device, data regarding a visual focus region of a display of the client device;
determine a first subset of an image that corresponds to the visual focus region of the display and a second subset of the image that is external to the visual focus region of the display;
apply a lossless encoding to the first subset of the image and a lossy encoding to the second subset of the image;
transmit, to the client device, the first subset through a first channel and the second subset through a second channel, wherein the first channel comprises a higher network bandwidth allocation than the second channel;
receiving, via a feedback channel, data regarding delivery of images between the server and the client device;
responsive to determining that the second subset was not received by the client device, increasing a priority level of the second subset of the image; and
retransmitting the second subset of the image based on the increased priority level.

8. The system of claim 7, wherein the first channel comprises a higher priority level than a priority level of the second channel.

9. The system of claim 7, wherein the visual focus region is based on at least one of a user's eye movement, head movement, hand gesture, body movement, keyboard input, and movement in a mouse position of the client device.

10. The system of claim 7, wherein the instructions, when executed by the at least one processor, further cause the system to transmit the first subset at a higher frequency than the frequency of transmission for the second subset.

11. The system of claim 7, wherein the instructions, when executed by the at least one processor, further cause the system to transmit the second subset at a later time than the transmission of the first subset.

12. The system of claim 7, wherein the instructions, when executed by the at least one processor, further cause the system to:

responsive to determining the value of the priority level of the second subset of the image to be above a predefined threshold value, transmit the second subset of the image through the first channel to the client device.

\* \* \* \* \*